United States Patent [19]

Lakoski et al.

[11] Patent Number: 4,685,312
[45] Date of Patent: Aug. 11, 1987

[54] DISK DRIVE LOCKING DEVICE

[75] Inventors: Robert P. Lakoski, Austin, Tex.;
Greg F. Esakoff, Huntington Harbor, Calif.

[73] Assignee: Lama Tool Company, Austin, Tex.

[21] Appl. No.: 881,030

[22] PCT Filed: Jan. 24, 1986

[86] PCT No.: PCT/US86/00113
§ 371 Date: Mar. 4, 1986
§ 102(e) Date: Mar. 4, 1986

Related U.S. Application Data

[63] Continuation-in-part of Ser. No. 694,269, Jan. 24, 1985, abandoned.

[51] Int. Cl.$^4$ ............................................. E05B 73/00
[52] U.S. Cl. ............................................. 70/14; 70/58
[58] Field of Search ........................ 70/14, 57, 58, 158, 70/159, 160–162, 163–173

[56] References Cited

U.S. PATENT DOCUMENTS

| | | | |
|---|---|---|---|
| 2,181,828 | 11/1939 | Ingwer | 70/161 |
| 3,096,409 | 7/1963 | Hubbell et al. | |
| 4,131,001 | 12/1978 | Gotto | 70/14 |
| 4,248,069 | 2/1981 | Burbank | |
| 4,462,233 | 7/1984 | Horetzke | 76/14 |
| 4,527,405 | 7/1985 | Renick | 70/58 |

FOREIGN PATENT DOCUMENTS

GB2131219 6/1984 United Kingdom .

Primary Examiner—Robert L. Wolfe
Attorney, Agent, or Firm—Hall, Myers & Rose

[57] ABSTRACT

A portable locking device is provided for securing a computer disk drive unit which incorporates cooperating interlocking unit engaging means, one of which hooks onto the unit through the drive unit and slot, the other being in a pivotal relationship with the first engaging means and both engaging means having complementary locking members to lock the means together.

20 Claims, 9 Drawing Figures

U.S. Patent  Aug. 11, 1987  Sheet 1 of 2  4,685,312
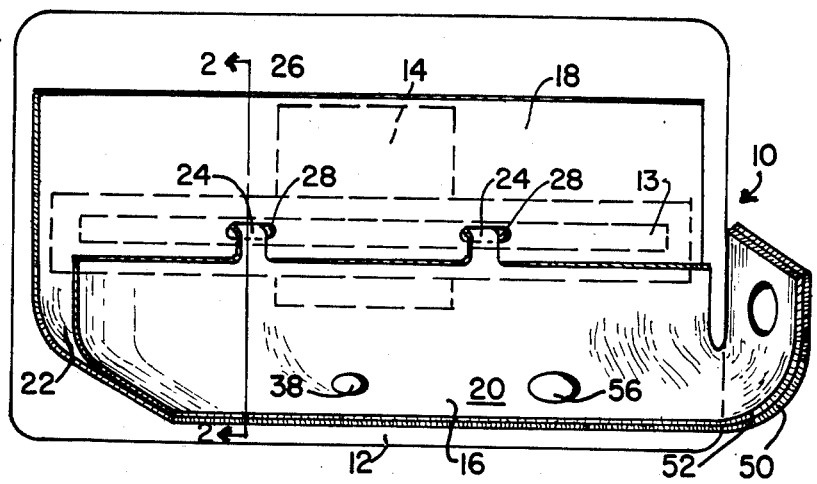
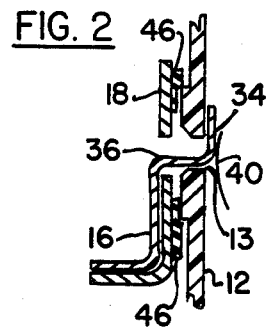
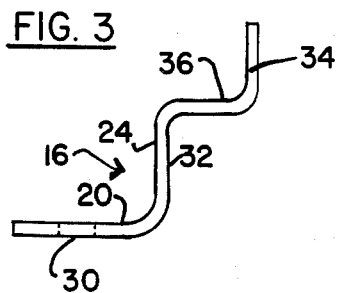
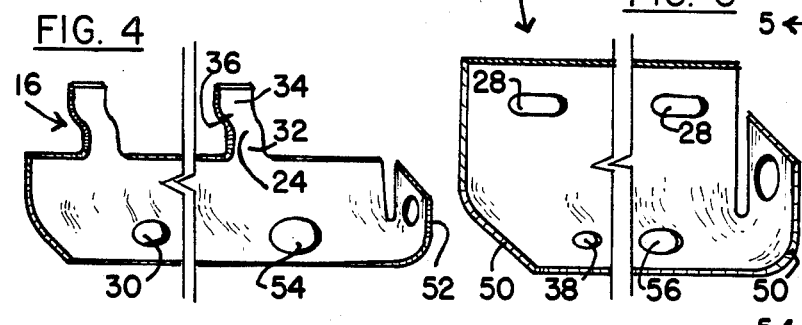
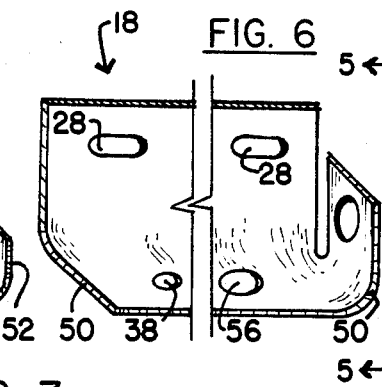
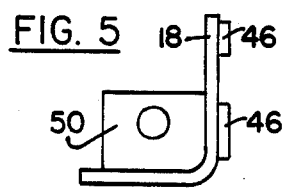
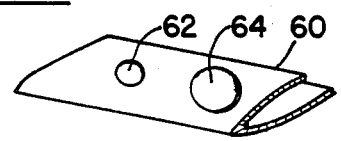

DISK DRIVE LOCKING DEVICE

PROSECUTION HISTORY

This application is a continuation-in-part application based on a parent application filed in the United States on Jan. 24, 1985 as Ser. No. 694,269 now abandoned. Accordingly, that priority date is claimed for the identified subject matter.

TECHNICAL FIELD

This invention relates to locking devices for computers and more particularly a portable device for locking disk drive units.

BACKGROUND OF THE INVENTION

Acceptance of personal computers is legion both in business and the home. The personal computer is readily adaptable to many environments and its versatility and capacity for information storage, retrieval and manipulation are primary factors leading to its popularity. As recognized, personal computers have evolved to the status of a "tool for modern times".

The primary adjunct of personal computers is floppy diskettes. These are magnetized disks containing information, programs or data files, in machine-readable form for storage, manipulation, viewing or printing. Conventional personal computers incorporate disk drive units having slots and gates adapted for insertion of floppy diskettes to perform the aforementioned functions.

In view of the remarkable popularity of personal computers and diskette use, associated criminal and security problems are now on the rise. Trade in stolen computer hardware and pirating software (the programs) exemplify such activities. An additional activity, which may critically affect the viability of a business, is pirating of proprietary information contained on floppy diskettes. The easiest and least detectable manner to accomplish such pirating is simple copying of the contents of an original diskette onto a new diskette, replacing the original, and absconding with the newly copied diskette.

As the computer hardware and diskettes are commonly located in the same locations, the only required activity for copying entails loading the original diskette into an activated computer and copying it to a new diskette; both relatively silent and fast operations. Information stolen in this manner could prove critical to the survival of a business and its misappropriation irrevocably damaging.

Many solutions to overcome these and other forms of criminal activity have been devised. Software incorporates anti-copy codes. Locking mounting brackets for the hardware and internal system key-locking assemblies like that featured on the IBM-AT ™ prevent outright theft of the units and unauthorized access to the system, respectively.

Internal locking systems generally are not available for less sophisticated, but far more numerous conventional personal computers. Retrofit installment of such devices requires considerable work and often is not economically justifiable. On the other hand, devices dedicated to render personal computers immovable such as mounting brackets, may secure the unit but are not portable by nature. Moreover, such brackets are somewhat cumbersome to install often leading to disfiguration of associated cabinets and furniture, and do not prevent access to disk drive units.

As can be noted from the foregoing discussion, unauthorized access to computer units may lead to many different problems. However, such access is not limited to the criminal sphere. Particularly when located in the home, unauthorized access may take the form of child's play. The curiosity of a small child is a universal trait and such curiosity may lead to tampering with a home computer. Hence, a child may damage the system or attempt to push objects into a disk drive unit which is not designed to accept such objects.

It is apparent from the foregoing that there exists a need in the art for a device that would serve to prevent unauthorized access and, further, if properly designed, to deter vandalism and outright theft of the unit.

SUMMARY OF THE INVENTION

It is an object of the present invention to provide a portable locking device for a personal computer.

It is another object of this invention to provide a disk drive locking device which prevents unauthorized access to a computer.

Still another object of certain embodiments of this invention is to provide a portable locking device for a disk drive unit that cannot be forcibly removed from the unit without causing damage thereto.

Yet another object of certain embodiments of this invention is to provide a locking device which covers a substantial portion of a disk drive unit to prevent vandalism thereto.

It is still another object of certain embodiments of the invention to provide a portable locking device which conforms to the configuration of the disk drive unit thereby not requiring its removal for proper functioning of the unit.

These and other objects are satisfied by the combination of a portable locking device for a computer disk drive unit characterized by a faceplate with an elongated slot which is adapted to receive a floppy diskette, a pivotally mounted blocking member, capable of movement between an unblocking position and a blocking position so that when said blocking member is in the blocking position a floppy diskette cannot be moved relative to said slot; first faceplate engaging means, said faceplate engaging means including a hooking element extending therefrom and adapted to be received by the faceplate through said slot, said faceplate engaging means further including a first locking member; and second unit engaging means for covering at least a portion of said slot, said second engaging means being in a pivotal relationship to said first faceplate engaging means and having a second locking member adapted to cooperate with said first locking member in a manner to prevent pivotal movement therebetween; whereby hooking said hooking element to said faceplate, pivoting said first faceplate engaging means and said second unit engaging means prevents a floppy diskette from being placed in or removed from said disk drive unit.

Additionally, certain of the foregoing objects are satisfied by a portable locking device for a computer disk drive unit including hasp means for placement in front of and blocking access to the disk drive unit slot and rendering the latching mechanism substantially immobile, said hasp means incorporating a first aperture and a first opening, and hinge means for coacting with said hasp means, said hinge means having cooperating, interlocking, extension means for being received in said first hasp opening and the drive unit slot, said extension means being slidingly receivable in the disk drive unit, said hinge means further defining a second aperture, alignable with said first hasp aperture where said first and second apertures are adapted to receive a lock, whereby inserting said hinge means through said hasp means and into the disk drive unit means and engaging a lock through said apertures secures said hinge and hasp means to the disk drive unit.

Therefore, this invention in the embodiment identified immediately above presents a simple, portable locking device which impedes direct access to a disk drive unit. Moreover, the device impedes misappropriation of information from unauthorized copying of diskettes. Furthermore, the invention deters theft of the computer unit because forcible removal of the device from the disk drive unit renders the unit inoperable. Additionally, the invention, in particular configurations, covers and prevents easy access to and, therefore, vandalism of a disk drive unit.

Certain of the foregoing objects are further satisfied by an embodiment of the invention providing a disk drive locking device for a computer disk drive unit including a faceplate with an elongated slot defined by boarders of enhanced thickness, a pivotally mounted gate and an angled notch located below the gate, said device comprising a securing bracket, said bracket having a configuration substantially conforming to the disk drive notch and having a hook member for hooking onto and engaging said drive unit, said bracket further including first member of a cooperating locking assembly; and a cover member having a bar adapted to cover a portion of the slot and a carrier element, said bar being united to and extending from said carrier element, said carrier element being pivotally mounted to said bracket, said carrier element further incorporating the second member of said cooperating locking assembly; where hooking said bracket onto said drive unit, pivoting said bar to cover said slot, and engaging said first and second members of said locking assembly prevents the device from being removed from the drive unit.

These and other advantages of the invention will become apparent to the skilled artisan upon review of the following description.

BRIEF DESCRIPTION OF THE DRAWINGS

FIG. 1 is a perspective view of a first embodiment of the invention.

FIG. 2 is a cutaway side view of the assembled invention illustrated in FIG. 1.

FIG. 3 is a cutaway side view of the hinge member of the invention of FIG. 1.

FIG. 4 is a perspective view of the hinge member.

FIG. 5 is a cutaway side view of the hasp member of the invention depicted in FIG. 1.

FIG. 6 is a perspective view of the hasp member.

FIG. 7 is a perspective view of an auxiliary member for use with the invention.

DETAILED DESCRIPTION OF THE ILLUSTRATED EMBODIMENTS

Figure 8:
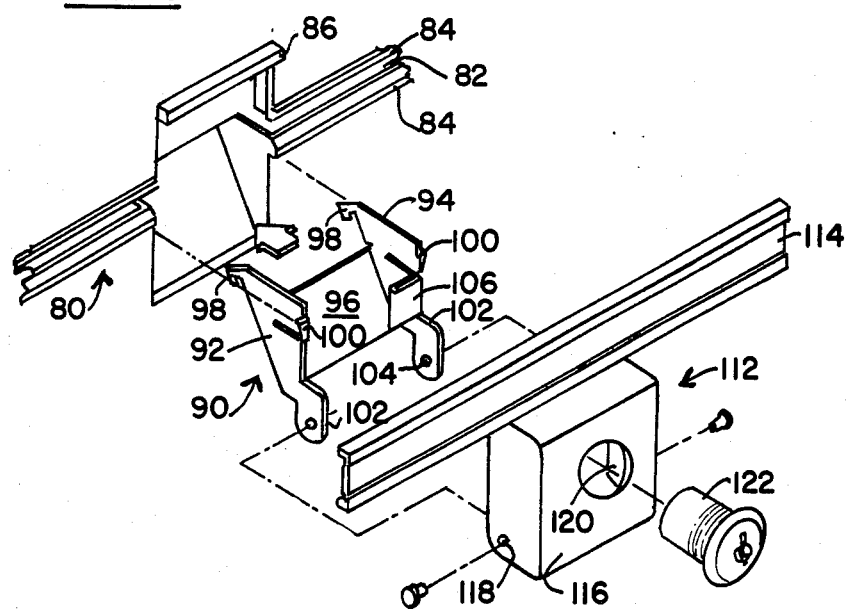
FIG. 8 is an assembly view of an alternative embodiment of the invention.

In FIG. 1, security device 10, one embodiment of the invention, is illustrated as attached in an interlocked and engaging manner with computer disk drive unit 12. Unit 12 is of conventional structure, such as that found on the IBM-PC, characterized by floppy disk receiving slot 13 and upwardly hinged, pivotally mounted gate 14. Conventional drive units also include a pivotally actuable disk drive latching unit incorporated with gate 14. Such latching mechanisms incorporate two metal pin members 40 (see FIG. 2), each being disposed along one side of the gate. These pins pivot downwardly across and perpendicular to slot 13 to engage the back of a diskette which has been inserted into the slot thereby securing it within the disk drive. Pins 40 pivot upwardly, away from slot 13, when gate 14 is opened. It is important to highlight pin members 40 as they coact with security device 10. However, for purposes of this invention, it is believed no further elaboration of the latching unit is required.

Device 10 features two distinct cooperating and coacting components; hinge 16 and hasp 18. A general description of each component is now provided. Hasp 18 features a generally rectangular vertical portion 26, which is adapted to lie against the front wall of disk drive unit 12, covering the slot 13 and gate 14. Hasp 18 by blocking gate 14, secures it in its closed position. Moreover by covering slot 13, hasp 18 prevents insertion or removal of a floppy diskette from the slot. Hasp 18 also includes horizontally projecting portion 22 and vertical lug member 50. The backside of hasp 18 is covered with compressible, resilient layer 46. Layer 46 serves the multiple purposes of preventing surface abrasion to the face of the disk drive unit, permitting hasp 18 to conform to the contour of the face of the disk drive unit and, if providing a complete seal around the slot and latch mechanism, preventing dust and other deleterious pollutants from entering the disk drive. Thus, hasp 18 may act as a dust cover for the disk drive unit. Compressible materials contemplated for layer 46 are felt, foam-rubber, etc.

Hinge 16 includes horizontally projecting portion 20 adapted to lie on horizontally projecting hasp portion 22 and vertical lug member 52 projecting from one edge of portion adapted to mate and coact with member 50. Hinge 16 also features two identical, vertically disposed hinge S-shaped leg members 24 adapted to rest against vertical hasp portion 26 and extend through and behind complementary holes 28 disposed therethrough.

Turning now to FIGS. 3, 4, 5 and 6, hinge 16 and hasp 18 are each illustrated in greater detail. All numerical values of dimension are approximations which are intended only to assist in the illustration and description of the invention; not to present absolute values.

Specifically referring to FIGS. 3 and 4, hinge 16, constructed from 0.065 inch thick brushed stainless steel, includes 0.75 inch by 3.4 inch horizontal portion 20. Portion 20 incorporates 0.25 inch diameter aperture 30 and 0.35 inch diameter aperture 54. Apertures 30 and 54 are provided with different diameters so as to be adapted to receive a large variety of conventional locking devices, such as combination locks, dial telephone locks, etc. Vertical member 52, projecting above one edge of portion 20, contains yet another aperture which is capable of receiving a locking device. Hinge 16 further features 0.25 inch wide vertical legs 24 separated by 1.81 inches, (as designed for an IBM-PC computer, pins 40 are approximately two inches apart). Resembling orthogonally displaced S-shaped projections, legs 24 include upper and lower vertically disposed members 32 and 34, 0.5 inch and 0.25 inch segments respectively, and 0.33 inch transverse horizontal member 36.

With reference to FIGS. 5 and 6, hasp 18 is L-shaped, having 0.87 inch by 3.5 inch horizontally projecting leg 22 incorporating lug 50 and apertures 38 and 56 corresponding in diameter and location to hinge apertures 30 and 54. Compressible, sealing layer 46 may cover the entire back of leg 26 or be of strip form of sufficient dimensions to seal slot 13 and latch 14 from dust as well as permitting hasp 18 to conform to the surface conformation of unit 12. Vertically disposed leg 26, formed along the back edge of leg 22, has two oblongated 0.3 inch long holes 28 complementary with hinge legs 24. Holes 28 are designed to lie over the front of slot 13 when hasp 18 is properly positioned on the front of unit 12.

Referring back to FIG. 2, the cooperating aspect of locking device 10 is represented. Hasp member 18 is placed on the front wall of disk drive unit 12 such that openings 28 lie in front of slot 13. Leg portions 34 of hinge 16 are passed horizontally through openings 28 and into slot 13. As the upper edges of portion 34 contact pins 40 of the disk drive latch assembly, hinge 16 is pivoted. Portions 34 slide upwardly between the wall and pins 40 while portions 36 move horizontally into slot 13. Accordingly, portions 34 are seated between pins 40 and the interior wall of disk drive unit 12 in a vertically disposed manner and portions 36 extend through slot 13 and holes 28. Leg portions 32 and horizontal portion 20 rest against the corresponding outwardly facing surfaces of hasp 18.

Apertures 30 and 38, aligned in a cooperating manner, form a continuous passage through hinge 16 and hasp 18. This provision permits a conventional locking device 42 such as a barbell-type lock or padlock to be inserted therethrough. As previously noted, conventional locking devices may also be secured to device 10 through cooperating apertures 54 and 56 or lug members 50 and 52. When locked together, hinge 16 and hasp 18 are rendered substantially immovable relative to each other as well as to disk drive unit 12. As is apparent when locked together, upper hasp leg 26 is of sufficient length to prevent assembled device 10 from being pivoted relative to unit 12. Furthermore, leg portion 34 projects upwardly into unit 12 to a sufficient degree so that any forceable attempt to remove locked assembly 10 will lead to damage of unit 12. Thus, the portable embodiment, as illustrated, serves to prevent piracy of proprietary information by preventing ready access to facilitating hardware. It is evident that due to the area covered by hasp 18, entry to slot 13 is prevented. Therefore, an individual seeking to vandalize the disk drive is deterred from easy access thereto.

Adjunctive locking element 60 is illustrated in FIG. 7. Although not necessary for practice of the invention, its presence strengthens locking device 10. Substantially U-shaped element 60 is designed to slide over horizontal projections 20 and 22 of hinge 16 and hasp 18, respectively. Apertures 62 and 64, corresponding to the cooperating apertures in projections 20 and 22, are provided in order that a lock may be inserted therethrough when element is properly positioned on device 10.

It can readily be appreciated that the steel employed in the manufacture of locking device 10 has a greater tensile strength than the conventional thermoplastic material composing the front wall of disk drive unit 12. This superior strength is desirable because attempted removal or deformation of device 10 when properly interlocked, will damage unit 12. Therefore, in addition to inhibiting information piracy, the invention deters wholesale theft of the associated hardware because of the damage generated from forced removal of the locked device from the disk drive unit reduces the computer's salability.

Potential modifications of the above-described embodiment of the invention are numerous. Certain representative variations of the above-described embodiment are now highlighted. This list is not intended to be inclusive but its purpose is merely to illustrate certain areas of a host of alternative forms and construction which are contemplated by the invention.

First, any strong, durable, break-resistant material, such as polycarbonates, aluminum, etc., may be substituted for the preferred steel and still achieve many of the desired objects of the invention. The invention may also be modified to secure disk drive units employing a conventional front-mounted, toggle latch assembly like that incorporated on the IBM-AT. By providing recessed means for receiving the toggle latch in the hinge and hasp members, the toggle latch is rendered substantially immovable between the closed and open positions. Thirdly, as is evident, the preferred embodiment is designed for assembly on a single full-size disk drive unit. The invention may be modified to provide a single assembly for blocking dual disk drives. This is accomplished merely by providing a single, elongated hasp element of sufficient length to extend across both drives and provide coacting apertures for securing two hinge members, one each complementary to each of the drives.

Yet another variation relates to the structure of the hinge and hasp members. The horizontally projecting legs may be eliminated in favor of a device which lies essentially on the disk drive face. In this embodiment a telephone dial locking device is inserted into and secured in a complementary aperture. In this manner the locking device projects perpendicularly from the hinge and hasp members lying on the face plate.

Figure 9:
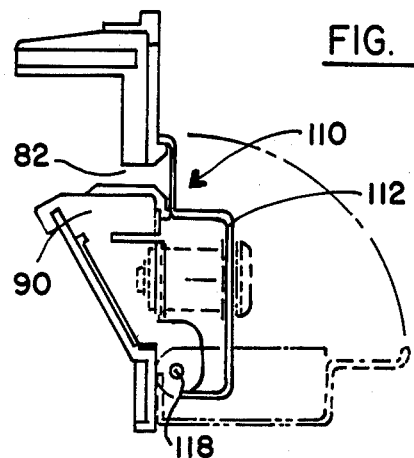
FIG. 9 is a cutaway side view of the invention illustrated in FIG. 8.

Moving now to an alternative structure for the invention which satisfies its purposes, it is illustrated in FIGS. 8 and 9. Alternative embodiment 110 is configured for permanent but removable mounting to disk drive unit 80 which features slot 82, built-up boarders 84, pivotal gate 86 and finger notch 88. Finger notch 88 is incorporated in the lower portion of and angles back from the front of unit 80 toward its interior. It is approximately the same width as gate 86.

Securing bracket 90 corresponds to the peripheral configuration of notch 88 in angle and width. Bracket 90 comprises substantially stereoisometric sides 92 and 94 connected by uniting back plate 96. Sides 92 and 94 both feature upper hooking members 98 which are complementary to and adapted to hook over the upper edge of notch 88. In this manner, the upper edges of sides 92 and 94 extend within notch 88 and below the lower edge of slot 82. Sides 92 and 94 also feature stabilizer projections 100 which project transversely and in opposite directions therefrom. Projections 100 are adapted to underlie and engage the lower edge of lower slot boarder 84. Projecting from the lower end of sides 92 and 94 are L-shaped members 102 each incorporating centrally disposed bore 104. Members 102 are intended to abut and project forward from the faceplate of unit 80. Lastly, side 94 features locking log 106 disposed perpendicularly therefrom and projecting into the space provided by notch 88.

As is readily apparent, particularly in FIG. 9, securing bracket 90 is designed and adapted to be secured to unit 80 so as not to obstruct slot 82 but also to be securely anchored to the unit.

Moving now to the second aspect of alternative embodiment 110, cover member 112, it is die cut and formed from medium guage cold rolled steel and features transverse bar or bezel 114, the cross-section of which conforms to the cross-sectional configuration of slot 82 and boarders 84 (see FIG. 9). The preferred structure includes bar 114 extending the full length of slot 82. Bar 114 is formed with or attached securely to base or carrier element 116 to form a unitary structure. Carrier 116 is of a box-like structure having a width and height closely corresponding to bracket 90.

At the bottom of the sides of carrier 116 are formed holes 118 which correspond to bores 104 in bracket 90. These align and are machine riveted or otherwise permanently joined together in a manner to permit pivotal movement between bracket 90 and cover 112. Centrally disposed on the front portion of carrier 116 is lock aperture 120 which is provided for seating conventional lock assembly 122 therein. The principal restriction or selection of lock assembly 122 is that it must be capable of coacting with lug 106 on bracket 90 to prevent relative movement between bracket 90 and cover element 112. The interlocking relationship of the above-described elements are more clear in FIG. 10.

When bracket 90 is engaged within notch 88, as illustrated, cover element 112, being pivotally attached thereto, is capable of movement between the slot covering position and the slot uncovered position (indicated by the hashed lines). When lock 122 is actuated in the slot covered position, bar 114 covers slot 82 in a manner to prevent installation or removal of a floppy disk located in disk drive unit 80. It is noteworthy that this embodiment does not in any way interfere with the function of the associated disk drive unit and when opened, the function of the gate.

Once given the above disclosure, various other modifications and improvements will become apparent to the skilled artisan. As such, they are considered to be part of the invention, the scope of which is to be determined by the following claims:

What is claimed is:

1. A portable locking device for a computer disk drive unit characterized by an elongated slot and pivotal latching mechanism, said locking device comprising:
   (a) hasp means having a first and second oppositely disposed surfaces, the first surface being adapted for placement in front of the computer disk drive unit to block access to at least a portion of the disk drive unit elongated slot and render the latching mechanism substantially immobile, said hasp means further incorporating a first aperture and a first opening, said aperture and opening extending between said first and second surfaces, and
   (b) hinge means for coacting with said hasp means, said hinge means having cooperating, interlocking, extension means for being received in said first hasp opening and the elongated slot of a disk drive, said extension means being slidingly receivable in a disk drive unit, said hinge means being adapted to abut at least a portion of said second hasp surface and further defining a second aperture, alignable with said first hasp aperture where said first and second apertures are adapted to receive a lock,
   (c) whereby inserting said hinge means through said hasp means and into the disk drive unit, bringing the hinge means into abutment with said second hasp surface and engaging a lock through said apertures, secures said hinge and hasp means to the disk drive unit.

2. In a portable locking device for a computer disk drive unit characterized by an elongated slot and pivotal diskette latching mechanism:
   (a) hasp means for positioning over and blocking access to the elongated slot and pivotal latching mechanism, said hasp means including a first portion adapted to abut the computer disk drive unit and a second portion adapted to project from the computer disk drive unit, said first portion incorporating an aperture and said second portion defining a first opening, and
   (b) hinge means for coacting with said hasp means to obtain an interlocking relationship, said hinge means defining a first projecting portion being engagable with said second hasp portion, said first portion incorporating a second opening complementary with said hasp opening, and a second extending portion for inserting through said hasp aperture,
   (c) whereupon positioning said hasp means on the front of the disk drive unit so the first opening is aligned with said slot, and inserting said second hinge extending portion therethrough and into the slot of the computer disk drive unit, said first and second complementary openings align for receiving a lock inserted therethrough which renders said hinge and hasp means substantially immovable relative to each other and to said disk drive unit.

3. A portable locking device for a computer disk drive unit characterized by an elongated slot and pivotal diskette latching mechanism, said locking device comprising:
   (a) an elongated hasp defining a first and a second legs, said legs being perpendicularly disposed, said first leg being adapted to cover a portion of the elongated slot and having two symmetrical oval apertures therethrough, and said second leg having an opening, and
   (b) an elongated hinge for cooperating with said hasp, said hinge incorporating a first and a second perpendicularly disposed portions, said first portion defining an opening complementary with said hasp opening and adapted to lie on said first hasp portion, said second portion incorporating a pair of remotely spaced, S-shaped legs, each leg being insertable through one of said hasp apertures and securable within the disk drive unit in an engaging manner with the latching mechanism,
   (c) where inserting said legs through said hasp member and into disk drive unit, said hinge and hasp cooperate to lock onto the disk drive unit and to permit a lock to be secured through said complementary openings.

4. A portable locking device according to claims 1, 2, or 3 further comprising a plurality of remotely spaced hinge extension means of which a portion is slidably received and engagable with a disk drive assembly, and a corresponding number of hasp openings to receive said extensions.

5. A portable locking device according to claims 1, 2, or 3 further comprising a plurality of apertures adapted to receive a variety of locks.

6. A portable locking device according to claim 4 where two extension means coact with two pin members of a latch assembly and are disposed between the wall of the disk drive unit and the pin members.

7. A portable locking device according to claim 4 where said hinge and hasp means are composed of rigid, inflexible material having a tensile strength greater than the tensile strength of the materials comprising the wall of the disk drive unit.

8. In combination,
(a) a computer disk drive unit characterized by a faceplate with an elongated slot which is adapted to receive a floppy diskette, a pivotally mounted blocking member, capable of movement between an unblocking position and a blocking position where when said blocking member is in the blocking position a floppy diskette cannot be moved relative to said slot;
(b) first faceplate engaging means, said faceplate engaging means including a hooking element extending therefrom and adapted to be received by the faceplate through said slot, said faceplate engaging means further including a first locking member; and
(c) second unit engaging means for covering at least a portion of said slot, said second engaging means being in a pivotal relationship to said first faceplate engaging means and having a second locking member adapted to cooperate with said first locking member in a manner to prevent pivotal movement therebetween;
(d) whereby hooking said hooking element to said faceplate, pivoting said first faceplate engaging means and said second unit engaging means prevents a floppy diskette from being placed in or removed from said disk drive unit.

9. A disk drive locking device for a computer disk drive unit including a faceplate with an elongated slot defined by boarders of enhanced thickness, a pivotally mounted gate and an angled notch located below the gate, said device comprising:
(a) a securing bracket, said bracket having a configuration substantially conforming to the disk drive notch and having a hook member for hooking onto and engaging said drive unit, said bracket further including first member of a cooperating locking assembly; and
(b) a cover member incorporating a cover element adapted to cover a portion of the elongated slot and a carrier element, said cover element being united to and extending from said carrier element and possessing a conformation complementary to the slot boarders, said carrier element being pivotally mounted to said bracket and further incorporating the second member of said cooperating locking assembly;
where hooking said bracket onto said drive unit, pivoting said cover element to cover the elongated slot, and engaging said first and second members of said locking assembly prevents the device from being removed from the drive unit.

10. A device according to claim 9 where said bracket is formed of tempered steel and includes projections adapted to lie against said faceplate.

11. A device according to claim 9 where the hooking member engages the upper edge of the slot in a manner not to obstruct the slot.

12. A device according to claim 9 where said cover element is a bar and the cross-sectional configuration and length of said bar corresponds to the elongated slot boarders.

13. A device according to claim 9 where said cover member is pivotable between the slot covering position and a second position in which the entire elongated slot and gate are exposed.

14. A computer disk drive locking device for a computer disk drive characterized by an elongated slot adapted to receive a floppy diskette and a contoured faceplate, comprising:
first means for abutting and overlying a portion of the contoured faceplate, said first means having a surface being adapted to conform with the faceplate contour and said first means including a first cooperating member of a locking element,
second means for engaging said first means and overlie and cover a substantial portion of said first means, said second means including a second cooperating member of a locking element
securing means for removably securing said first and second means to the faceplate which when secured to the faceplate, said first and second means cover at least a portion of the elongated slot and said locking element is established by said first and second cooperating members
locking means for locking said locking element thereby locking said first and second means together on the faceplate in a manner to cover the portion of the elongated slot.

15. A device according to claim 14 where the faceplate includes an angled finger notch having an upper edge coincident with the elongated slot, said first means is configured to correspond to the configuration of the notch, said securing means are hooking members to hook over the upper notch edge, said first and second means are pivotally connected, and said second means covers an elongated slot portion.

16. A device according to claim 15 where said second cooperating member is a locking assembly, said first cooperating member is a lug.

17. A device according to claim 15 where said first and second cooperating members are apertures and said locking means is a padlock.

18. A device according to claim 14 where said first means covers the faceplate and elongated slot portions, said first means having at least two apertures and an opening, said second means is adapted to abut said first means, and has an opening, said securing means are projections adapted for projection through the first means apertures, into the elongated slot and behind the faceplate, thereby securing said first and second means to the faceplate to cover the slot and align said openings of said first and second means.

19. A device according to claim 18 where said locking means is a locking assembly adpated to pass through said openings and lock said first and second means together.

20. A device according to claim 18 where said locking means is a padlock sized to be received in said openings.

* * * * *